United States Patent
Li

(10) Patent No.: US 12,022,414 B2
(45) Date of Patent: Jun. 25, 2024

(54) SYNCHRONIZATION SIGNAL BLOCK TRANSMISSION METHOD, DEVICE AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 316 days.

(21) Appl. No.: 17/598,198

(22) PCT Filed: Mar. 25, 2019

(86) PCT No.: PCT/CN2019/079558
§ 371 (c)(1),
(2) Date: Sep. 24, 2021

(87) PCT Pub. No.: WO2020/191587
PCT Pub. Date: Oct. 1, 2020

(65) Prior Publication Data
US 2022/0167291 A1    May 26, 2022

(51) Int. Cl.
H04W 56/00    (2009.01)
(52) U.S. Cl.
CPC ..... *H04W 56/001* (2013.01); *H04W 56/0095* (2013.01)
(58) Field of Classification Search
CPC .......................... H04W 56/001; H04W 56/0095
See application file for complete search history.

(56) References Cited

U.S. PATENT DOCUMENTS

| | | | |
|---|---|---|---|
| 10,277,349 B1 * | 4/2019 | Kotecha | H04B 7/0695 |
| 10,383,023 B1 * | 8/2019 | Hahn | H04W 36/03 |
| 2017/0251441 A1 | 8/2017 | Axnas et al. | |
| 2018/0324853 A1 | 11/2018 | Jeon et al. | |
| 2019/0045559 A1 | 2/2019 | Huang et al. | |

(Continued)

FOREIGN PATENT DOCUMENTS

| | | |
|---|---|---|
| CN | 108270710 A | 7/2018 |
| CN | 108282198 A1 | 7/2018 |

(Continued)

OTHER PUBLICATIONS

International Search Report of PCT Application No. PCT/CN2019/079558 dated Dec. 31, 2019 with English translation, (5p).

(Continued)

*Primary Examiner* — James P Duffy
(74) *Attorney, Agent, or Firm* — Arch & Lake LLP

(57) ABSTRACT

A synchronization signal block transmission method, a device and a storage medium thereof are provided. The method includes that a first device including n antenna panels uses k antennal panels of the n antenna panels for receiving a synchronization signal block sent by at least one antenna panel of at least one second device, where n is an integer greater than or equal to 2. Additionally, in accordance with signal strength of each synchronization signal block received by each of the k antenna panels, the first device determines, from the at least one second device, a target second device for carrying out synchronization.

18 Claims, 5 Drawing Sheets

(56) References Cited

U.S. PATENT DOCUMENTS

| | | | |
|---|---|---|---|
| 2019/0090212 A1* | 3/2019 | Chou | H04B 7/0408 |
| 2019/0141744 A1* | 5/2019 | Naghshvar | H04B 7/0452 |
| 2019/0200306 A1 | 6/2019 | Ko et al. | |
| 2020/0336194 A1* | 10/2020 | Karjalainen | H04W 24/10 |
| 2021/0021326 A1 | 1/2021 | Cui et al. | |
| 2021/0127425 A1* | 4/2021 | Park | H04B 7/0695 |
| 2022/0094420 A1 | 3/2022 | Cui et al. | |
| 2022/0167291 A1* | 5/2022 | Li | H04W 56/0095 |

FOREIGN PATENT DOCUMENTS

| | | |
|---|---|---|
| CN | 108632980 A | 10/2018 |
| CN | 109257818 A | 1/2019 |
| CN | 109327897 A | 2/2019 |
| CN | 109417717 A | 3/2019 |
| CN | 109474939 A | 3/2019 |
| CN | 109478943 A | 3/2019 |
| CN | 111315007 A | 6/2020 |
| WO | 2018082550 A1 | 5/2018 |
| WO | 2018222931 A1 | 12/2018 |
| WO | 2018230975 A1 | 12/2018 |
| WO | 2018231010 A1 | 12/2018 |

OTHER PUBLICATIONS

LG Electronics, "Discussion on RACH Procedure", 3GPP TSG RAN WG1 Meeting #88, R1-1702442, Athens, Greece, Feb. 13-17, 2017, (4p).

Ericsson, "On Multi-TRP and Multi-Panel Transmission", 3GPP TSG-RAN WG1, Meeting #89, R1-1708673, May 19, 2017.

Written Opinion of the ISA issued in PCT Application No. PCT/CN2019/079558 dated Dec. 31, 2019 , English translation, (4p).

First Office Action issued in Chinese Application No. 201980000553.8 dated Jan. 21, 2021, (delay in translation) (7p).

Second Office Action issued in Chinese Application No. 201980000553.8 dated Jun. 21, 2021, (delay in translation) (7p).

Huawei et al., "Discussion and evaluation on NR-PBCH design", 3GPP TSG RAN WG1 Meeting #89 R1-1708162, Hangzhou, China, May 15-19, 2017, (8p).

Samsung, "WF on SS Block Index Indication", 3GPP TSG RAN WG1 Meeting RAN1#89 R1-1709490, Hangzhou, P.R. China May 15-19, 2017, (4p).

Fourth Office Action of the Chinese Application No. 201980000553.8, dated Mar. 1, 2022 with English translation, (19p).

Office Action of the Indian Application No. 202147047547, dated Apr. 7, 2022 with partial English translation, (6p).

Decision of Rejection issued in Chinese Application No. 201980000553.8 dated Jun. 2, 2022 with English translation, (9p).

NTT DOCOMO et al:"Discussion on multi-beam enhancement" 3GPP Draft; R1-1902813, 3rd Generation Partnership Project (3GPP), Mobile Competence Centre; 650, Route Des Lucioles • F-06921 Sophia-Antipolis Cedex—France vol. RAN WG1 No. Athens Greece-Feb. 25, 2019-Mar. 1, 2019 Feb. 15, 2019 (Feb. 15, 2019), XP051600508, (22p).

Extended European Search Report in the European Application No. 19922110.2, dated Oct. 4, 2022, (11p.).

* cited by examiner

SYNCHRONIZATION SIGNAL BLOCK TRANSMISSION METHOD, DEVICE AND STORAGE MEDIUM

CROSS-REFERENCE TO RELATED APPLICATION

This application is the U.S. national phase application of International Application No. PCT/CN2019/079558, filed on Mar. 25, 2019, the entire contents of which are incorporated herein by reference for all purposes.

TECHNICAL FIELD

The present disclosure relates to the technical field of communications, and particularly to a method and apparatus for transmitting a synchronization signal block, and a storage medium.

BACKGROUND

With the rapid development of communication technologies, wireless communication networks have moved towards a 5th-generation (5G) mobile communication network. In a 5G system, data amount transmitted between devices will be greatly increased.

In the related art, data transmission may be mutually performed between multiple devices. For the devices requiring transmission on synchronized data transmission resources, synchronization always needs to be first performed through synchronization signal blocks. For example, in two devices (a base station and a terminal), one device (the base station) sends a synchronization signal block, and the other device (the terminal) receives the synchronization signal block transmitted by the base station, and synchronizes with the base station. In the 5G system, most base stations and terminals may adopt multiple antenna panels to perform data transmission. However, there is no perfect solution at present for how these devices use multiple antenna panels to transmit synchronization signal blocks.

SUMMARY

The present disclosure provides a method and an apparatus method and apparatus for transmitting a synchronization signal block, and a storage medium. The technical solutions are implemented as follows.

According to a first aspect of the present disclosure, a method for transmitting a synchronization signal block is provided. The method is performed by a first device that includes n antenna panels, where n is an integer greater than or equal to 2. The method includes the following operations.

Synchronization signal blocks sent by at least one second device through at least one antenna panel are received through k antenna panels of the n antenna panels, where $1 \leq k \leq n$, and k is an integer.

Furthermore, a second target device that performs synchronization is determined from the at least one second device according to signal strength of all synchronization signal blocks received by the k antenna panels.

According to a second aspect of the present disclosure, a method for transmitting a synchronization signal block is provided. The method is executed by a second device that includes m antenna panels, where m is an integer greater than or equal to 2. The method includes that synchronization signal blocks are respectively sent through j antenna panels of the m antenna panels, where $2 \leq j \leq m$, and j is an integer.

According to a third aspect of the present disclosure, an apparatus for transmitting a synchronization signal block is provided. The apparatus is applied in a first device that includes n antenna panels, where n is an integer greater than or equal to 2. The apparatus includes a receiver and a processor. The receiver is configured to receive, through k antenna panels of the n antenna panels, synchronization signal blocks that are sent by at least one second device through at least one antenna panel, where $1 \leq k \leq n$, and k is an integer.

Furthermore, the processor is configured to determine a second target device that performs synchronization from the at least one second device according to signal strength of all synchronization signal blocks received by the k antenna panels.

According to a fourth aspect of the present disclosure, an apparatus for transmitting a synchronization signal block is provided. The apparatus is applied to a second device that includes m antenna panels, where m is an integer greater than or equal to 2. The apparatus includes a transmitter configured to respectively send synchronization signal blocks through j antenna panels of the m antenna panels, where $2 \leq j \leq m$, and j is an integer.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure.

Instead, they are merely examples of devices and methods consistent with aspects related to the present disclosure as recited in the appended claims.

Network architecture and business scenarios described in the embodiments of the present disclosure are intended to illustrate the technical solutions of the embodiments of the present disclosure more clearly, and do not limit the technical solutions provided by the embodiments of the present disclosure. Those of ordinary skill in the art will learn that with the evolution of the network architecture and the emergence of new business scenarios, the technical solutions provided in the embodiments of the present disclosure are also applicable to similar technical problems.

The unlicensed spectrum is a spectrum that may be accessed and used by devices that meet certain specifications and standards, but it must ensure not causing interference to other users. Typically, communication technologies such as Wireless Fidelity (Wi-Fi) and Bluetooth (BT) implements transmission through the unlicensed spectrum. In addition, the International Telecommunication Union-Radiocommunication Sector has defined that the Industrial Scientific Medical (ISM) frequency band, which is mainly applied by three types of institutions: industry, science and medicine, without the need of license, but it is also required to follow a certain transmission power and can not cause interference to other frequency bands.

Figure 1:
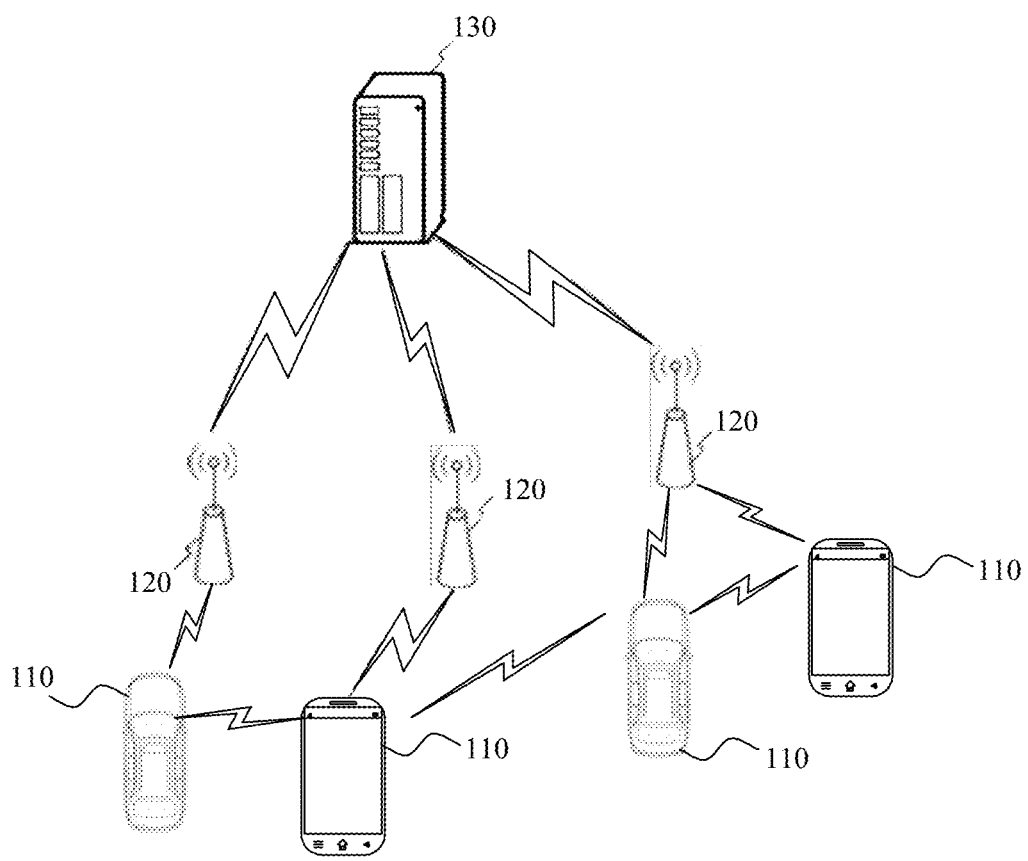
FIG. 1 is a structure diagram of a wireless communication system according to an embodiment of the present disclosure.

FIG. 1 is a structure diagram showing a wireless communication system according to an embodiment of the present disclosure. As shown in FIG. 1, the wireless communication system is a cellular mobile communication technology based communication system, and may include: a plurality of terminals 110 and a plurality of base stations 120.

The terminals 110 may refer to devices providing voice and/or data connectivity for a user. The terminal 110 may communicate with one or more core networks through a Radio Access Network (RAN). The terminal 110 may be an Internet of Things terminal, such as a sensor device, a mobile phone (or called a "cellular" phone) and a computer with the Internet of Things terminal, which for example, may be a stable, portable, pocket-sized, handheld, computer-embedded or vehicle-mounted device, for example, a Station (STA), a subscriber unit, a subscriber station, a mobile station, a mobile, a remote station, an access point, a remote terminal, an access terminal, a user terminal, a user agent, a user device or User Equipment (UE). Or, the terminal 110 may be an Unmanned Aerial Vehicle (UAV). Or, the terminal 110 may also be a vehicle-mounted device, for example, a driving computer with wireless communication function or a wireless communication device connected to a driving computer. Or, the terminal 110 may also be a roadside device, for example, a street lamp, a signal lamp or other roadside devices with wireless communication function.

The base stations 120 may be network-side devices in a wireless communication system. The wireless communication system may be a 4th Generation mobile communication (4G) system, also called a Long Term Evolution (LTE) system. Or, the wireless communication system may also be a 5th-Generation (5G) system, also called a New Radio (NR) system or a 5GNR system. Or, the wireless communication system may also be a next-generation system of the 5G system. An access network in the 5G system may be called New Generation-Radio Access Network (NG-RAN).

The base station 120 may be an Evolved Node B (eNB) in the 4G system. Or, the base station 120 may also be a gNB adopting a central distributed architecture in the 5G system. The base station 120, when adopting the central distributed architecture, usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are arranged in the CU, and a protocol stack of a Physical (PHY) layer is arranged in the DU. The specific implementation manner of the base station 120 is not limited in the embodiments of the present disclosure.

The base station 120 may establish a wireless connection with the terminal 110 through a radio air interface. In different implementation modes, the radio air interface is a 4G-standard-based radio interface; or, the radio air interface is a 5G-standard-based radio interface, for example, the radio air interface is an NR interface; or, the radio air interface may also be a radio air interface based on a next-generation mobile communication network technology standard of 5G.

Alternatively, an End to End (E2E) or Device to Device (D2D, terminal-to-terminal direct communication) connection may also be established between the terminals 110, for example, scenarios such as Vehicle to Vehicle (V2V) communication, Vehicle to Infrastructure (V2I) communication, and Vehicle to Pedestrian (V2P) communication in Vehicle to Everything (V2X) communication.

Alternatively, the wireless communication system described above may also include a network management device 130.

A plurality of base stations 120 are connected to the network management device 130 respectively. The network management device 130 may be a core network device in the wireless communication system. For example, the network management device 130 may be a Mobility Management Entity (MME) in an Evolved Packet Core (EPC). Or, the network management device may also be another core network device, for example, a Serving GateWay (SGW), a Public Data Network GateWay (PGW), a Policy and Charging Rules Function (PCRF) or a Home Subscriber Server (HSS). The implementation form of the network management device 130 is not limited in the embodiments of the present disclosure.

In the wireless communication system shown in FIG. 1 above, in a process of establishing synchronization between the terminal and the base station, usually the base station sends synchronization signal blocks to the terminal, and the terminal synchronizes with the base station through content information indicated by the synchronization signal block. Or, a synchronization process may also be established between the above-mentioned terminals. For example, one terminal is a smart phone or a vehicle-mounted device, and the other terminal is a vehicle-mounted device. The vehicle-mounted device needs to send a synchronization signal block on a Sidelink to the smart phone or another vehicle-mounted device, and after receiving the synchronization signal block, the smart phone synchronizes with the vehicle-mounted device according to the content information indicated by the synchronization signal block. At present, in the related art, when sending or receiving the synchronization signal block, a device always adopts a single antenna panel for transmission.

With the development of communication technology, in the 5G NR system, both base stations and terminals may adopt multiple antenna panels to transmit data. For a scenario using multiple antenna panels, a device that sends synchronization signal blocks may send a synchronization signal block on its own beam resources through multiple antenna panels thereof. Correspondingly, a device that receives the synchronization signal block may also receive the synchronization signal block on its own beam resources through multiple antenna panels thereof. Alternatively, the above-mentioned multiple antenna panels may belong to the same Transmitter Receiver Point (TRP), or belong to multiple different TRPs. That is, one device may have one or more TRPs, each TRP may have one or more antenna panels, and different antenna panels may correspond to different beam directions. However, there is still no perfect solution at present for how to transmit synchronization signal blocks on multiple antenna panels.

Figure 2:
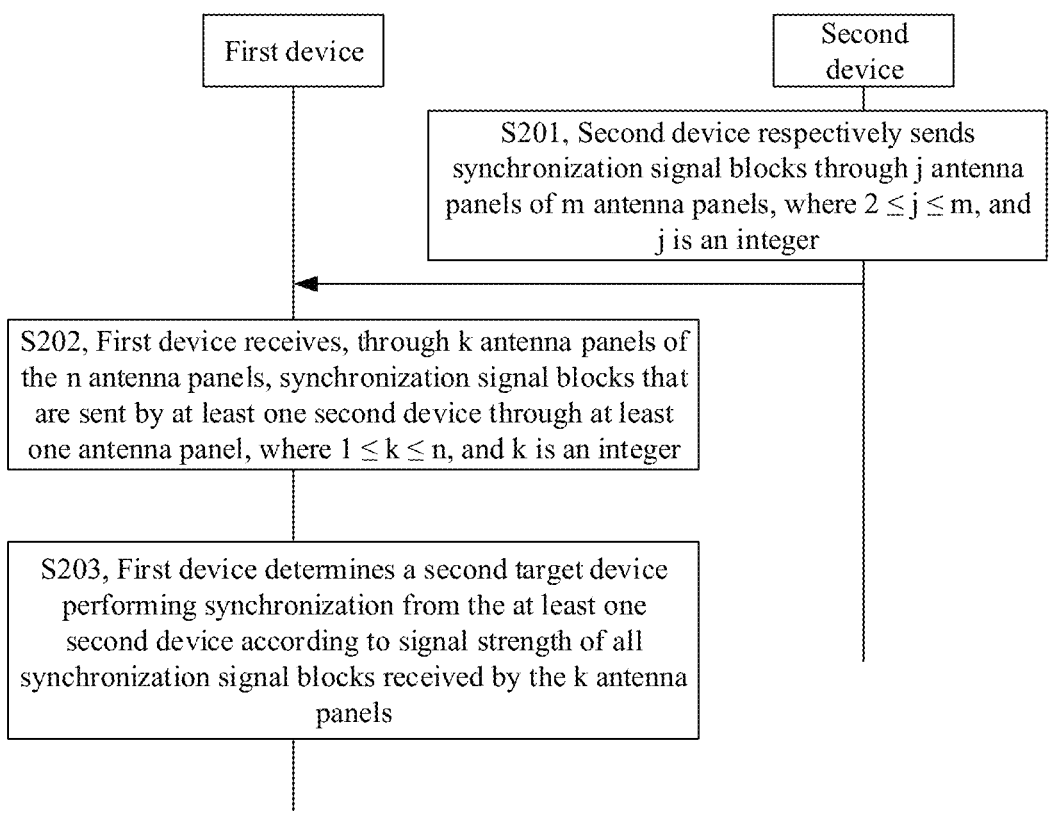
FIG. 2 is a flowchart of a method of synchronization signal transmission according to an embodiment of the present disclosure.

FIG. 2 is a method flowchart showing a method of synchronization signal transmission according to an embodiment of the present disclosure. The method may be applied to the wireless communication system shown in FIG. 1. The method is executed by a second device that may send synchronization signal blocks and a first device that may receive the synchronization signal blocks in the wireless communication system. As shown in FIG. 2, the method may include the following operations.

In S201, the second device respectively sends synchronization signal blocks through j antenna panels of m antenna panels, where 2≤j≤m, and j is an integer.

The second device may be a device that may send synchronization signal blocks in the above wireless communication system, for example, a vehicle-mounted device and a base station. The second device includes m antenna panels, where m is an integer greater than or equal to 2.

Alternatively, the synchronization signal blocks, sent through the j antenna panels at the same symbol positions in a time window occurring periodically for transmission of synchronization signal blocks, contain the same synchronization signal block identifiers and the same synchronization signal block contents.

The synchronization signal blocks, sent through the j antenna panels at different symbol positions in the time window occurring periodically for transmission of synchronization signal blocks, contain different synchronization signal block identifiers.

Alternatively, the operation that synchronization signal blocks are respectively sent through j antenna panels of m antenna panels includes that:

in a first time period, the synchronization signal blocks are respectively sent through a first part of antenna panels in the j antenna panels, the first part of antenna panels being at least one of the j antenna panels; and in a second time period, the synchronization signal blocks are respectively sent through a second part of antenna panels in the j antenna panels, the second part of antenna panels being at least one of the j antenna panels, except for the first part of antenna panels.

Alternatively, before the operation that synchronization signal blocks are respectively sent through j antenna panels of m antenna panels, the method may further include that:

channel detection is performed, through the j antenna panels in an LBT mode, on frequency domain resources used by the second device to send the synchronization signal blocks; and when a channel detection result of each of the j antenna panels indicates an idle state, the operation that synchronization signal blocks are respectively sent through j antenna panels of m antenna panels is executed.

Alternatively, the frequency domain resources used by the second device to send the synchronization signal blocks are unlicensed spectrum;

or, the frequency domain resources used by the second device to send the synchronization signal blocks are frequency domain resources shared by multiple second devices.

Alternatively, the number of antenna panels in a sending state at the same time among the m antenna panels is L, and a maximum sending power of each antenna panel in the L antenna panels is 1/L of a maximum sending power of the second device, where L is a positive integer less than or equal to m; or, the sum of sending powers of each of the L antenna panels is less than or equal to the maximum sending power of the second device.

In S202, the first device receives, through k antenna panels of n antenna panels, synchronization signal blocks sent by at least one second device through at least one antenna panel, where 1≤k≤n, and k is an integer.

The first device includes n antenna panels, where n is an integer greater than or equal to 2.

In S203, a second target device for performing synchronization is determined among the at least one second device according to signal strength of all synchronization signal blocks received by the k antenna panels.

Alternatively, the operation that a second target device that performs synchronization is determined from the at least one second device according to signal strength of all synchronization signal blocks received by the k antenna panels includes that:

a target synchronization signal block is acquired from the synchronization signal blocks received by the k antenna panels, the target synchronization signal block being a synchronization signal block with the strongest signal strength among the synchronization signal blocks received by the k antenna panels; and the second device that sends the target synchronization signal block is determined as the second target device.

Alternatively, the operation that a second target device that performs synchronization is determined among the at least one second device according to signal strength of all synchronization signal blocks received by the k antenna panels includes that:

an average value of signal strength of M synchronization signal blocks with the strongest signal strength, received by the k antenna panels and sent by each second device of the at least one second device, is acquired, where M is an integer greater than or equal to 2; and a second device corresponding to the highest average value is determined as the second target device.

Alternatively, the operation that an average value of signal strength of M synchronization signal blocks with the strongest signal strength, received by the k antenna panels and sent by each second device of the at least one second device, is acquired includes that:

the sum of signal strength of the M synchronization signal blocks with the strongest signal strength, received by the k antenna panels and sent by a target device, is acquired, the target device being any one device of the at least one second device; and the sum of signal strength is divided by M to obtain an average value of the signal strength of the M synchronization signal blocks with the strongest signal strength, sent by the target device.

Alternatively, the operation that an average value of M synchronization signal blocks with the strongest signal strength, received by the k antenna panels and sent by each second device among the at least one second device, is acquired includes that:

signal strength of M synchronization signal blocks with the strongest signal strength, received through the k antenna panels and sent by a target device, are acquired;

weights of the M synchronization signal blocks are acquired; and weighted averaging is performed on the signal strength of the M synchronization signal blocks according to the weights of the M synchronization signal blocks, to obtain an average value of the signal strength of the M synchronization signal blocks.

Alternatively, the synchronization signal blocks, sent through at least one antenna panel of the same second device at the same symbol positions in a time window occurring periodically for transmission of synchronization signal blocks, contain the same synchronization signal block identifiers and the same synchronization signal block contents; and the synchronization signal blocks, sent through at least one antenna panel of the same second device at different symbol positions in the time window occurring periodically for transmission of synchronization signal blocks, contain different synchronization signal block identifiers.

Alternatively, DMRS sequences of the synchronization signal blocks, sent at the same symbol positions in the time window occurring periodically for transmission of synchronization signal blocks, are the same, and the synchronization signal blocks at the same symbol positions are received using the same receiving beam(s).

In summary, for the application scenario where the first device has multiple antenna panels, according to the present disclosure, the synchronization signal blocks sent by at least one second device through at least one antenna panel are received through k antenna panels of n antenna panels of the first device receive, and the second target device for performing synchronization is determined among the at least one second device according to the signal strength of each of synchronization signal blocks received through the k antenna panels. In this way, the first device can receive the synchronization signal blocks from at least one second device based on different antenna panels thereof, so that the efficiency of receiving the synchronization signal blocks by the device with multiple antenna panels is improved, while the application scenarios of synchronization signal block transmission are expanded.

Figure 3:
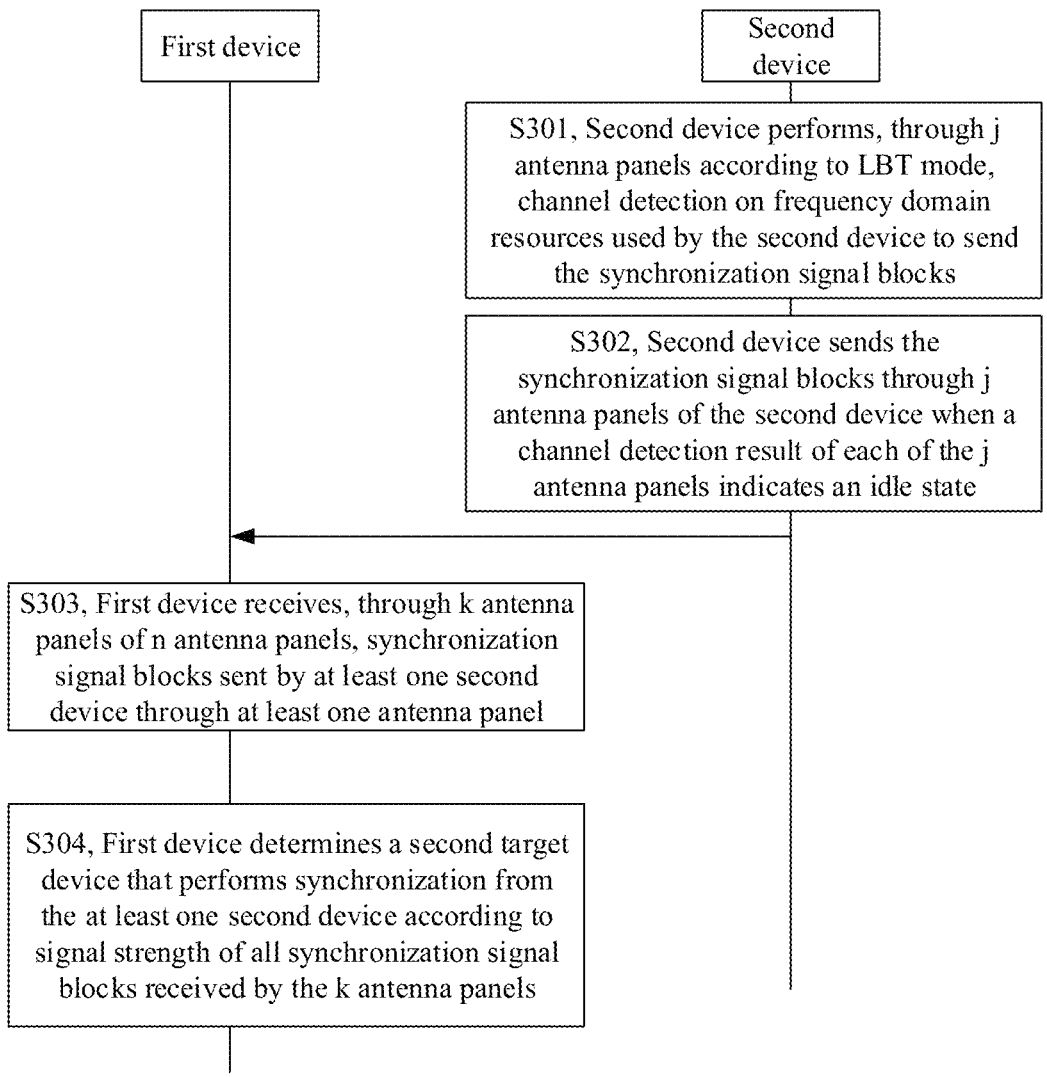
FIG. 3 is a flowchart of a method of synchronization signal transmission according to an embodiment of the present disclosure.

FIG. 3 is a method flowchart showing a method of synchronization signal transmission according to an embodiment of the present disclosure. The method may be applied to the wireless communication system shown in FIG. 1. The method is executed by a second device that may send synchronization signal blocks and a first device that may receive the synchronization signal blocks in the wireless communication system. As shown in FIG. 3, the method may include the following operations.

In S301, the second device performs, through j antenna panels in an LBT mode, channel detection on frequency domain resources used by the second device to send the synchronization signal blocks.

The second device includes m antenna panels, where m is an integer greater than or equal to 2, $2 \le j \le m$, and j is an integer.

The second device capable of sending the synchronization signal blocks may be a base station, a vehicle-mounted device, or the like in the wireless communication system shown in FIG. 1. In an embodiment of the disclosure, the second device is provided with multiple antenna panels (m antenna panels). When the second device needs to send the synchronization signal block, the second device may select j antenna panels from the m antenna panels for sending. Alternatively, when a frequency domain resource of the second device for sending the synchronization signal block is unlicensed spectrum, for example, the second device is the base station in the wireless communication system shown in FIG. 1, when the frequency domain resource used by the bases station for sending the synchronization signal block to the first device is the unlicensed spectrum, the base station will perform channel detection on the frequency domain resource for sending the synchronization signal block through LBT before sending the synchronization signal block.

Alternatively, when a frequency domain resource used by the second device for sending the synchronization signal block is a frequency domain resource shared by multiple second devices, for example, the second device is the vehicle-mounted device in the wireless communication system shown in FIG. 1, since the frequency domain resource of the vehicle-mounted device for sending the synchronization signal block is shared by multiple vehicle-mounted devices, then each vehicle-mounted device will also perform channel detection on the frequency domain resource for sending the synchronization signal blocks, through LBT before sending the synchronization signal block to the first device, to determine whether the frequency domain resource has been occupied by the other vehicle-mounted device, and if it is not occupied, the vehicle-mounted device may use the frequency domain resource. Further, in the above cases, the channel detection performed by the antenna panels of the second device may refer to channel detection that is performed respectively by j antenna panels required send the synchronization signal block. It is to be noted that the synchronization signal block that is sent by the vehicle-mounted device refers to a synchronization signal block adaptable to a sidelink.

It is to be noted that the second device performing channel detection through j antenna panels means that channel detection is performed on respective frequency domain resource sending the synchronization signal block by the j antenna panels of the second device according to their respective LBT modes. For example, the second device selects a first antenna panel, a second antenna panel, and a third antenna panel for sending synchronization signal blocks. Before these antenna panels send the synchronization signal blocks, the first antenna panel performs channel detection in its LBT mode, the second antenna panel performs channel detection in its LBT mode, and the third antenna panel performs channel detection in its LBT mode. Alternatively, the three antenna panels may adopt the same or different LBT modes.

In S302, when a channel detection result of each of the j antenna panels indicates an idle state, synchronization signal blocks are respectively sent through the j antenna panels in the second device.

Only when a channel resource detected by each of the j antenna panels indicates an idle state, the corresponding antenna panel can send its synchronization signal block. For example, still taking the first antenna panel, the second antenna panel, and the third antenna panel mentioned above as an example, that is, when j=3, and two of the three antenna panels detect that their frequency domain resources for sending synchronization signal blocks are in an idle state, the two antenna panels may send respective synchronization signal blocks, while the other one can only send the synchronization signal block thereof when detecting that the frequency domain resource for sending the synchronization signal block is in an idle state. That is, the moments at which the j antenna panels may send the synchronization signal blocks may be different.

Figure 4:
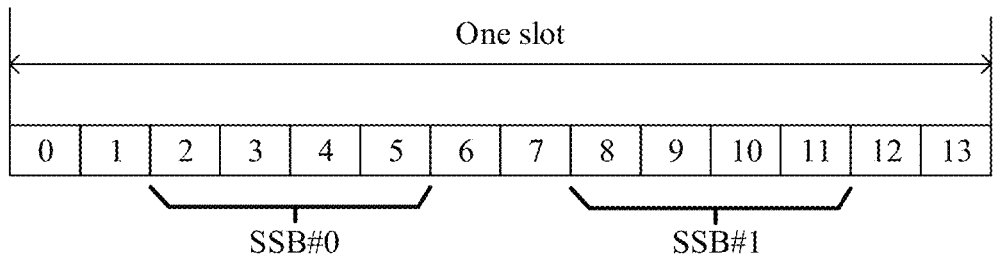
FIG. 4 is a structure diagram of a slot structure according to an embodiment of the present disclosure.

In a possible implementation mode, the second device may re-send the synchronization signal blocks that are sent for the first time by each of the antenna panels, on multiple antenna panels respectively multiple times. For example, the second device may directly perform multiple repeated transmissions of the synchronization signal blocks determined on each antenna panel directly according to a preset retransmission strategy. For example, according to a predetermined number of retransmissions, multiple repeated transmissions are performed on multiple continuous or discontinuous time domain resources. For example, synchronization signal blocks are sent periodically, and the transmission period may be 5 ms, 10 ms, 20 ms, 40 ms, 80 ms, or 160 ms. The synchronization signal blocks may be substituted with synchronization signal block sets, and one synchronization signal block set may include 4, 8, 16, or 64 synchronization signal blocks. Alternatively, the synchronization signal blocks sent by the second device may be synchronization signal blocks independently generated, or may be synchronization signal blocks in Discovery Reference Signals (DRSs). In each period of the synchronization signal blocks, there is a time window for transmission of the synchronization signal blocks, for example, the transmission time window is 5 ms. When a subcarrier spacing is 15 KHz, 5 ms window contains 5 slots, and each slot contains 14 symbols as shown in FIG. 4. FIG. 4 illustrates a structure diagram of a slot structure according to an embodiment of the present disclosure. When the number of synchronization signal blocks in each transmission time window is 4, an identifier of a first synchronization signal block is SSB #0, which occupies symbols #2 to #5 of a first slot within 5 ms; an identifier of a second synchronization signal block is SSB #1, which occupies symbols #8 to #11 of the first slot within 5 ms; an identifier of a third synchronization signal block is SSB #2, which occupies symbols #2 to #5 of a second slot within 5 ms; and an identifier of a fourth synchronization signal block is SSB #3, which occupies symbols #8 to #11 of the second slot within 5 ms.

In order to enable that a receiving terminal may merge and decode the received synchronization signal blocks that are simultaneously sent by the second device through j antenna panels, the j antenna panels of the second device should ensure that: the synchronization signal blocks, sent at the same symbol positions in a time window occurring periodically for transmission of synchronization signal blocks, contain the same synchronization signal block identifiers and the same synchronization signal block contents, and the synchronization signal blocks, sent at different symbol positions in the time window occurring periodically for transmission of synchronization signal blocks, contain different synchronization signal block identifiers.

Alternatively, the synchronization signal blocks, sent by the j antenna panels at the same symbol positions in the time window occurring periodically for transmission of synchronization signal blocks, contain the same synchronization signal block identifiers and the same synchronization signal block contents. That is, the identifiers of the synchronization signal blocks sent on the symbols #2 to #5 of the first slot within the transmission time window of 5 ms in each period is SSB #0, and each synchronization signal block contains the same synchronization signal block content. The synchronization signal content includes system frame numbers, and information indicating time frequency positions of control channel resources of system information transmission resources, etc. The synchronization signal blocks, sent by the j antenna panels at different symbol positions in the time window occurring periodically for transmission of synchronization signal blocks, contain different synchronization signal block identifiers. That is, the identifiers of the synchronization signal blocks sent on the symbols #2 to #5 of the first slot within the transmission time window of 5 ms in each period are SSB #0, while the identifiers of the synchronization signal blocks sent on the symbols #8 to #11 of the first slot within the transmission time window of 5 ms are SSB #1, and thus the identifiers of the synchronization signal blocks sent at different symbol positions are different.

Under the condition of the periodical transmission of synchronization signal blocks, when the j antenna panels send their respective synchronization signal blocks, DMRS sequences of the synchronization signal blocks, sent by the second device at the same symbol positions in the synchronization signal block transmission time window that occurs periodically, may be the same, and the synchronization signal blocks at the same symbol positions may use the same receiving beams. As shown in FIG. 4, one slot contains 14 symbols, where the 2nd to the 5th symbol positions in the slot correspond to the sent synchronization signal block SSB #0, and the 8th to 11th symbol positions in the slot correspond to the sent synchronization signal block SSB #1. Among four symbols in each of the synchronization signal block, DMRS sequences for PBCH demodulation are contained in the 2nd to 4th symbols. That is, the identifiers of the synchronization signal blocks sent, by any one of the j antenna panels of the second device, on symbols #2 to #5 of the first slot within the transmission time window of 5 ms in each period are SSB #0, and the DMRS sequences sent on the symbols #3 to #5 are the same; and any of the antenna panels uses the same sending beam(s) when transmitting SSB #0 on symbol #2~#5 of the first slot within the transmission time window of 5 ms in each period. That is, the first antenna panel always uses a sending beam 1 to send SSB #0, the second antenna panel always uses a sending beam 2 to send SSB #0. That is to say, different antenna panels may use different sending beams to send the same synchronization signal block at the same symbol position, but the same antenna panel needs to use the same sending beam(s) when sending the same synchronization signal block at the same symbol positions in different periods. In this way, it is convenient for the first device to receive the same synchronization signal block at the same symbol position in each period by using the same receiving beam(s); and moreover, the same DMRS sequences are used to decode the same Physical Broadcast Channels (PBCHs), which facilitates merged reception.

Alternatively, in a first time period, the synchronization signal blocks are respectively sent through a first part of the j antenna panels, the first part of the antenna panels referring to at least one of the j antenna panels; and in a second time period, the synchronization signal blocks are respectively sent through a second part of the j antenna panels, the second part of the antenna panels referring to at least one antenna panel other than the first part of antenna panels.

In the process of sending synchronization signal blocks, periodical transmission as above exists. That is, for the same synchronization signal block, if the same antenna panel is continuously used for transmission in different periods, the first devices covered by the synchronization signal block will be limited because the coverage area of each antenna panel is limited. In addition, if all of the antenna panels are used for sending the same synchronization signal block at the same time, the sending power of each antenna panel is also limited, making a signal unable to reach far. Further, the second device may select a part of the j antenna panels to send the synchronization signal blocks within one time period, and select another part of the j antenna panels to send the synchronization signal blocks in another time period.

It is to be noted that the identifiers of the synchronization signal blocks sent by the second device through different antenna panels in different time periods may be the same or different. Referring back to FIG. 4, for example, in a transmission time window of the first synchronization signal block, the first antenna panel is used to send SSB #0, and the second antenna panel is used to send SSB #1, that is, the sending time of SSB #0 serves as the first time period, and the sending time of SSB #1 serves as the second time period. The first antenna panel is one of the first part of antenna panels, and the second antenna panel is one of the second part of antenna panels. Thus, the identifiers of the synchronization signal blocks sent by different antenna panels are different.

Under another possible condition, the first antenna panel is used to send SSB #0, SSB #1, SSB #2 and SSB #3 in a transmission time window of the first synchronization signal block, and the second antenna panel is used to send SSB #0, SSB #1, SSB #2 and SSE #3 in a transmission time window of the second synchronization signal block. That is, the transmission time window of the first synchronization signal block serves as the first time period, the transmission time window of the second synchronization signal block serves as the second time period. The first antenna panel is one of the first part of antenna panels, the second antenna panel is one of the second part of antenna panels, and thus, the identifiers of the synchronization signal blocks sent by the different antenna panels are the same.

Regarding the above two possible conditions, no matter which one is adopted, a part of antenna panels may be used for transmission at the same time. If the power of each antenna panel is not increased, then the power can be saved; and if the power of each antenna panel is increased, the synchronization signal blocks sent by the antenna panel may reach a farther position under the coverage of the antenna panel. Alternatively, all of the antenna panels may be adopted to send the synchronization signal blocks at the same time, so that multiple antenna panels are used to cover all angles, achieving omnidirectional coverage.

Alternatively, according to the embodiment of the present disclosure, the operating power of the antenna panels operating at the same time in the second device has a certain limitation, and the limitation manner may be as follows. The number of antenna panels in a sending state at the same time among the m antenna panels is L, and a maximum sending power of each antenna panel in the L antenna panels is 1/L of a maximum sending power of the second device, where L is a positive integer less than or equal to m; or, the sum of the sending power of each of the L antenna panels is less than or equal to the maximum sending power of the second device.

For example, when the maximum sending power of the second device is W, and the number of antenna panels of the second device for sending synchronization signal blocks to the first device at the same time is e, then the maximum number of antenna panels on each of the e antenna panels cannot be greater than 1/e of W; or, the sum of the sending power of the e antenna panels in the second device cannot be greater than W. Alternatively, the power limitation condition is also applicable to other cases where the second device transmits data through multiple antenna panels.

In S303, the first device receives, through k antenna panels of the n antenna panels, the synchronization signal blocks sent by at least one second device through at least one antenna panel.

The first device includes n antenna panels, where n is an integer greater than or equal to 2, $1 \leq k \leq n$, and k is an integer.

When there are synchronization signal blocks sent by multiple second devices around the first device, the first device may receive the synchronization signal blocks sent by the multiple second devices through multiple antenna panels thereof. Generally, each antenna panel of the first device may receive multiple synchronization signal blocks sent from the multiple second devices.

Alternatively, corresponding to an implementation mode in which the second device may periodically send synchronization signal blocks, the synchronization signal blocks, sent by at least one antenna panel of the same second device at the same symbol positions in the time window occurring periodically for transmission of synchronization signal blocks, contain the same synchronization signal block identifiers and the same synchronization signal block contents; and the synchronization signal blocks, sent by at least one antenna panel of the same second device at different symbol positions in the time window occurring periodically for transmission of synchronization signal blocks, contain different synchronization signal block identifiers. That is, the synchronization signal blocks, that are sent by at least one antenna panel of the same second device and received by the first device through k antenna panels at the same symbol positions in the time window occurring periodically for transmission of synchronization signal blocks, contain the same synchronization signal block identifiers and the same synchronization signal block contents.

Alternatively, the received synchronization signal blocks, sent by at least one antenna panel of the same second device at different symbol positions in the time window occurring periodically for transmission of synchronization signal blocks, contain different synchronization signal block identifiers. Other forms of the first device receiving the synchronization signal blocks sent by the second device may refer to the description in S302, and will not be elaborated here.

Alternatively, corresponding to an implementation mode in which the second device may periodically send synchronization signal blocks, the first device may periodically receive the synchronization signal blocks sent by the second device. Alternatively, when the first device receives the synchronization signal blocks, the DMRS sequences of the synchronization signal blocks, sent at the same symbol positions in the time window occurring periodically for transmission of synchronization signal blocks, are the same, and the synchronization signal blocks at the same symbol positions are received using the same receiving beam(s). That is, the DMRS sequences when the first device receives, through k antenna panels, the synchronization signal block sent by the second device at the same symbol positions in the time window occurring periodically for transmission of synchronization signal blocks may be the same with the DMRS sequences when the first device receives the synchronization signal blocks which are sent by the second device at the same symbol positions in the same time window for transmission of synchronization signal blocks within a first period, and the corresponding receiving beam thereof may be the same as the receiving beam when the first device receives, through the k antenna panels, the synchronization signal blocks which are sent by the second device at the same symbol positions in the same synchronization signal block transmission time window within the first period.

For example, when the first device periodically receives a synchronization signal block 1 from the second device through an antenna panel A of the k antenna panels, during the periodical receiving of the antenna panel A, a DMRS sequence and a receiving beam adopted when the antenna panel A receives the synchronization signal block 1 from the second device at the same symbol position in the same synchronization signal block transmission time window are the same as those when the antenna panel A receives the synchronization signal block 1 from the second device for the first time.

Alternatively, corresponding to the above implementation mode for the second device that sends the synchronization signal block, synchronization signal block identifiers received by the k antenna panels of the first device may be the same or different. The first device can merge and decode the synchronization signal blocks with the same synchronization signal block identifiers and contents, among the at least two synchronization signal blocks received by the above k antenna panels and sent by the same second device, thereby obtaining more accurate synchronization signal block content.

For example, an antenna panel 4 and an antenna panel 5 of the k antenna panels of the first device receive synchronization signal blocks 1 with the same synchronization signal block identifier and content sent by the same second device, and the first device may merge and decode the synchronization signal blocks 1 received by the two antenna panels.

In S304, the first device determines a second target device that performs synchronization from the at least one second device according to signal strength of all synchronization signal blocks received by each of the k antenna panels.

The first device may select among the synchronization signal blocks received from at least one second device to determine one second device, so as to perform synchronization with the second device. Alternatively, the first device may determine a second device corresponding to a synchronization signal block from the synchronization signal blocks according to one or a combination of more of: signal strength, a signal frequency, a signal peak value, and a signal attenuation rate of each received synchronization signal block, as the second target device. That is, when there are multiple base stations and vehicle-mounted devices around the first device, the first device needs to first determine which base station or vehicle-mounted device is the second device for synchronization, and then synchronizes with the determined base station or vehicle-mounted device.

In a possible implementation mode, taking the operation of determining the corresponding second target device according to the signal strength of each synchronization signal block received by the k antenna panels as an example, that is, when each of the k antenna panels of the first device receives each synchronization signal block from at least one second device, synchronization signal block identifiers of the corresponding synchronization signal blocks and Layer 1-Reference Signal Received Powers (L1-RSRPs) and/or Layer 1-Signal to Interference & Noise Ratios (L1-SINRs) of the synchronization signal blocks may be obtained, and then the corresponding second target device is determined based on the L1-RSRPs and/or L1-SINRs of the synchronization signal blocks.

Further, the first device may first acquire a target synchronization signal block in each of synchronization signal blocks received by the k antenna panels, and then determine a second device that sends the target synchronization signal block as a second target device. The target synchronization signal block is a synchronization signal block with the strongest signal strength among the synchronization signal blocks received by the k antenna panels; that is, the target synchronization signal block may be a synchronization signal block with the highest L1-RSRP and/or L1-SINR.

For example, the first device receives synchronization signals from two second devices through the k antenna panels, and the synchronization signal blocks sent by the two second devices are as follows: a synchronization signal block 1 of the second device 1, a synchronization signal block 2 of the second device 1, a synchronization signal block 1 of the second device 2, and a synchronization signal block 2 of the second device 2. RSRP values corresponding to the synchronization signal block 1 of the second device 1, the synchronization signal block 2 of the second device 1, the synchronization signal block 1 of the second device 2, and the synchronization signal block 2 of the second device 2 may be: RSRP #1, RSRP #2, RSRP #3, and RSRP #4, respectively. The first device may sort the RSRP values of the above four synchronization signal blocks received by the k antenna panels. For example, a sorting result is: RSRP #1>RSRP #2>RSRP #3>RSRP #4. At this time, the first device may acquire the synchronization signal block 1 of the second device 1 as the target synchronization signal block, and use a second device 1 corresponding to the synchronization signal block 1 of the second device 1 as the second target device and synchronize with the second target device.

In a possible implementation mode, the first device may further acquire an average value of signal strength of M synchronization signal blocks with the strongest signal strength, received by the k antenna panels and sent by each second device among the at least one second device, where M is an integer greater than or equal to 2; and determine a second device corresponding to the highest average value as the second target device. That is, the target synchronization signal block may be a synchronization signal block with the highest average value of the RSRP values.

Alternatively, the first device acquires the sum of signal strength of M synchronization signal blocks with the strongest signal strength, received by the k antenna panels and sent by a target device. The sum of signal strength is divided by M to obtain an average value of the signal strength of the M synchronization signal blocks with the strongest signal strength, sent by the target device. The target device is any one of the at least one second device.

For example, taking M being 2 as an example, the first device acquires the signal strength of M synchronization signal blocks with the strongest signal strength, received by the k antenna panels and sent by a target device. Taking two second devices as an example, for example, the signal strength of two synchronization signal blocks with the strongest signal, sent by the second device 1 and received by the k antenna panels of the first device, are RSRP #5 and RSRP #6 respectively, and the signal strength of two synchronization signal blocks with the strongest signal, sent by the second device 2 and received by the k antenna panels of the first device, are RSRP #7 and RSRP #8 respectively. Then, when (RSRP #5+RSRP #6)/2 is greater than (RSRP #7+RSRP #8)/2, the second device 1 is selected as the second target device, or otherwise, the second device 2 is selected as the second target device.

In a possible implementation mode, the first device may acquire a weighted average of signal strength of M synchronization signal blocks with the strongest signal strength, received by the k antenna panels and sent by a target device; and determine a second device corresponding to the synchronization signal block with a maximum weighted average as the second target device. Alternatively, the first device may acquire the signal strength of M synchronization signal blocks with the strongest signal strength, received by the k antenna panels and sent by a target device; acquire weights of the M synchronization signal blocks; perform weighted averaging on the signal strength of the M synchronization signal blocks according to the weights of the M synchronization signal blocks, to obtain an average value of the signal strength of the M synchronization signal blocks.

Alternatively, the weight of each synchronization signal block sent by the target device may be acquired according to the signal strength corresponding to each synchronization signal block sent by the target device. For example, referring to Table 1, a weight correspondence relationship table involved in the embodiments of the present disclosure is shown. Table 1 contains a correspondence relationship between signal strength and weights of the synchronization signal blocks.

TABLE 1

| Signal strength | Weight |
|---|---|
| Signal strength 1 | Weight 1 |
| Signal strength 2 | Weight 2 |
| ... | ... |

Table 1 may be stored in the first device. When it is required to acquire a weight of a synchronization signal block corresponding to signal strength, Table 1 may be queried to obtain corresponding signal strength, so as to obtain the weight of the synchronization signal block corresponding to the signal strength. For example, if the RSRP value corresponding to a synchronization signal block received by the k antenna panels of the first device is the same as the signal strength 1 in Table 1, then the weight of the synchronization signal block acquired by the first device is the weight 1. Alternatively, the correspondence relationship between the signal strength and the weights in Table 1 above may also be replaced by a correspondence relationship between signal strength intervals and weights. The first device determines signal strength interval corresponding to a RSRP value according to the RSRP value corresponding to a synchronization signal block received by the k antenna panels, and searches for a weight corresponding to the signal strength interval in Table 1.

Still taking M being 2 as an example, the first device acquires two synchronization signal blocks with the strongest signal strength, received by the k antenna panels and sent by a target device. Taking two second devices as an example, for example, the signal strength of the two synchronization signal blocks with the strongest signal strength, sent by the second device 1 and received by the k antenna panels of the first device, are RSRP #5 and RSRP #6 respectively, and the weights are respectively 0.7 and 0.3; and the signal strength of the two synchronization signal blocks with the strongest signal, sent by the second device 2 and received by the k antenna panels of the first device, are RSRP #5 and RSRP #6 respectively, and the weights are respectively 0.6 and 0.4. When (0.7*RSRP #5+0.3*RSRP #6) is greater than (0.6*RSRP #7+0.4*RSRP #8), the second device 1 is selected as the second target device, or otherwise, the second device 2 is selected as the second target device.

In a possible implementation mode, the weight of each of synchronization signal blocks sent by the target device may be acquired as follows. The first device first sorts respective signal strength of the synchronization signal blocks sent by the target device, and then acquires the weights of the synchronization signal blocks sent by the target device according to a sorting result. For example, referring to Table 2, a weight correspondence relationship table involved in the embodiments of the present disclosure is shown. Table 2 contains a correspondence relationship between sorting positions of the signal strength and weights of the synchronization signal blocks.

TABLE 2

| Sorting position | Weight |
|---|---|
| Sorting position 1 | Weight 1 |
| Sorting position 2 | Weight 2 |
| ... | ... |

Table 2 may be stored in the first device. When it is required to acquire a weight of a synchronization signal block corresponding to a certain signal strength, signal strength corresponding to the synchronization signal blocks sent by the target device are sorted first to obtain a respective sorting position of each synchronization signal block sent by the target device. Then, a weight of the synchronization signal block corresponding to the signal strength may be obtained by querying Table 2. For example, for one antenna panel among the k antenna panels, assuming that it receives three synchronization signal blocks, the signal strength corresponding to these three synchronization signal blocks are ($RSRP_1$, $RSRP_2$, $RSRP_3$), where $RSRP_1 > RSRP_2 > RSRP_3$, and each sorting position has a corresponding weight in Table 2. Alternatively, the correspondence relationship between the sorting positions and the weights of the synchronization signal blocks in the above Table 2 may also be replaced with a correspondence relationship between sorting intervals and weights, for example: the top 3 of the sorting positions correspond to the same weight.

In summary, for the application scenario where the first device has multiple antenna panels, according to the present disclosure, the first device receives, through k antenna panels of the n antenna panels, the synchronization signal blocks sent by at least one second device through at least one antenna panel, and determines the second target device for performing synchronization from the at least one second device according to the signal strength of the synchronization signal blocks received by the k antenna panels. In this way, the first device can receive the synchronization signal blocks from at least one second device based on different antenna panels thereof, so that the efficiency of receiving the synchronization signal block receiving by the device with multiple antenna panels is improved, while the application scenarios of synchronization signal block transmission are expanded.

The following are apparatus embodiments of the present disclosure, which may be used to perform the method embodiments of the present disclosure. The details undisclosed in the apparatus embodiments of the present disclosure may be understood with reference to the method embodiments of the present disclosure.

Figure 5:
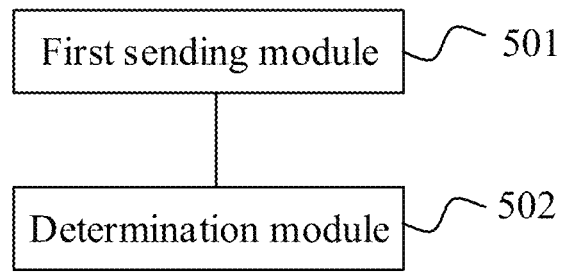
FIG. 5 is a block diagram showing a synchronization signal block transmission apparatus according to an embodiment.

FIG. 5 is a block diagram showing a synchronization signal block transmission apparatus according to an embodiment. As shown in FIG. 5, the synchronization signal block transmission apparatus may be implemented as all or part of a terminal that may receive synchronization signal blocks in the implementation environment shown in FIG. 1 through hardware or a combination of software and hardware, to execute the operations executed by the first device in the embodiments shown in any one of FIG. 2 or FIG. 3. The first device includes n antenna panels, where n is an integer greater than or equal to 2. The synchronization signal transmission apparatus may include: a first sending module 501 and a determination module 502.

The first sending module 501 is configured to receive, through k antenna panels of the n antenna panels, synchronization signal blocks sent by at least one second device through at least one antenna panel, where $1 \leq k \leq n$, and k is an integer.

The determination module 502 is configured to determine a second target device for performing synchronization from the at least one second device according to signal strength of all synchronization signal blocks received by the k antenna panels.

Alternatively, the determination module 502 includes a first acquisition submodule and a first determination submodule.

The first acquisition submodule is configured to acquire a target synchronization signal block among the synchronization signal blocks received by the k antenna panels, the target synchronization signal block being a synchronization signal block with the strongest signal strength among the synchronization signal blocks received by the k antenna panels.

The first determination submodule is configured to determine a second device that sends the target synchronization signal block as the second target device.

Alternatively, the determination module 502 includes a second acquisition submodule and a second determination submodule.

The second acquisition submodule is configured to acquire an average value of signal strength of M synchronization signal blocks with the strongest signal, received by the k antenna panels and sent by each second device of the at least one second device, where M is an integer greater than or equal to 2.

The second determination submodule is configured to determine a second device corresponding to a highest average value as the second target device.

Alternatively, the second acquisition submodule includes: a first acquisition unit and a first obtaining unit.

The first acquisition unit is configured to acquire the sum of the signal strength of the M synchronization signal blocks with the strongest signal, received by the k antenna panels and sent by a target device, the target device referring to any device of the at least one second device.

The first obtaining unit is configured to divide the sum of the signal strength by M to obtain an average value of the signal strength of the M synchronization signal blocks with the strongest signal strength, sent by the target device.

Alternatively, the second acquisition submodule includes: a second acquisition unit, a third acquisition unit, and a second obtaining unit.

The second acquisition unit is configured to acquire the signal strength of the M synchronization signal blocks with the strongest signal strength, received by the k antenna panels and sent by a target device.

The third acquisition unit is configured to acquire weights of the M synchronization signal blocks.

The second obtaining unit is configured to perform weighted averaging on the signal strength of the M synchronization signal blocks according to the weights of the M synchronization signal blocks, to obtain an average value of the signal strength of the M synchronization signal blocks.

Alternatively, the synchronization signal blocks, sent by at least one antenna panel of the same second device at the same symbol positions in a time window occurring periodically for transmission of synchronization signal blocks, contain the same synchronization signal block identifiers and the same synchronization signal block contents;

the synchronization signal blocks, sent by at least one antenna panel of the same second device at different symbol positions in the time window occurring periodically for transmission of synchronization signal blocks, contain different synchronization signal block identifiers.

Alternatively, DMRS sequences of the synchronization signal blocks, sent at the same symbol positions in the time window occurring periodically for transmission of synchronization signal blocks, are the same, and the synchronization signal blocks at the same symbol positions are received using the same receiving beam(s).

Figure 6:
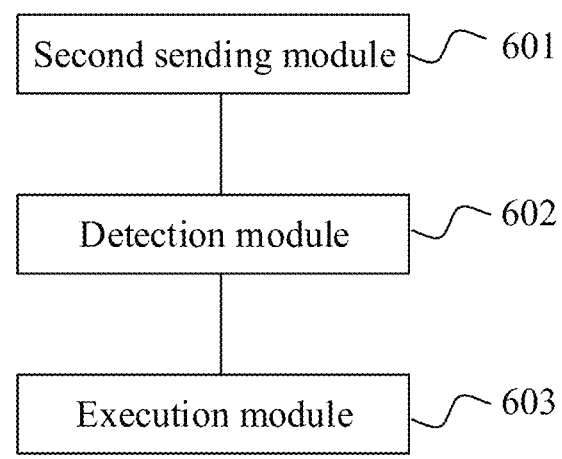
FIG. 6 is a block diagram showing an apparatus for transmitting a synchronization signal block according to an embodiment.

FIG. 6 is a block diagram showing an apparatus for transmitting a synchronization signal block according to an embodiment. As shown in FIG. 6, the apparatus for transmitting a synchronization signal block may be implemented as all or part of a device that may send synchronization signal blocks in the implementation environment shown in FIG. 1 through hardware or a combination of software and hardware, to execute the steps executed by the second device in the embodiments shown in any one of FIG. 2 or FIG. 3. The second device includes m antenna panels, where m is an integer greater than or equal to 2. The apparatus of synchronization signal transmission may include a second sending module 601.

The second sending module 601 is configured to respectively send synchronization signal blocks through j antenna panels of the m antenna panels, where $2 \leq j \leq m$, and j is an integer.

Alternatively, the synchronization signal blocks, sent by the j antenna panels at the same symbol positions in a time window occurring periodically for transmission of synchronization signal blocks occurring periodically, contain the same synchronization signal block identifiers and the same synchronization signal block contents; and the synchronization signal blocks, sent by the j antenna panels at different symbol positions in the time window occurring periodically for transmission of synchronization signal blocks, contain different synchronization signal block identifiers.

Alternatively, the second sending module 601 is configured to:

in a first time period, respectively send the synchronization signal blocks through a first part of the j antenna panels; the first part of the antenna panel referring to at least one of the j antenna panels; and in a second time period, respectively send the synchronization signal blocks through a second part of the j antenna panels, the second part of the antenna panels referring to at least one of the j antenna panels, except for the first part of the antenna panels.

Alternatively, the apparatus further includes: a detection module 602 and an execution module 603.

The detection module 602 is configured to: before the first sending module respectively sends the synchronization signal blocks through the j antenna panels of the m antenna panels, perform, through the j antenna panels in LBT mode, channel detection on frequency domain resources of the second terminal for sending the synchronization signal blocks.

The execution module 603 is configured to execute, when a channel detection result of each of the j antenna panels indicates an idle state, the operation that the second sending module 601 respectively sends the synchronization signal blocks through the j antenna panels of m antenna panels.

Alternatively, the frequency domain resources used by the second device for sending the synchronization signal blocks are unlicensed spectrum;

or, the frequency domain resources used by the second device for sending the synchronization signal blocks are frequency domain resources shared by multiple second devices.

Alternatively, the number of antenna panels in a sending state at the same time among the m antenna panels is L, and a maximum sending power of each antenna panel in the L antenna panels is 1/L of a sending transmission power of the second device, where L is a positive integer less than or equal to m; or, the sum of sending powers of each of the L antenna panels is less than or equal to the maximum sending power of the second device.

An embodiment of the present disclosure further provides an apparatus for transmitting a synchronization signal block, which may implement all or part of the steps executed by the first device in the embodiments of the present disclosure shown in FIG. 2, or FIG. 3. The apparatus for transmitting a synchronization signal block includes: a processor; and a memory configured to store instructions executable by the processor.

The processor is configured to:

receive, through k antenna panels of the n antenna panels, synchronization signal blocks sent by at least one second device through at least one antenna panel, where 1≤k≤n, and k is an integer; and determine a second target device that performs synchronization from the at least one second device according to signal strength of all synchronization signal blocks received by the k antenna panels.

Alternatively, in the operation that a second target device that performs synchronization is determined from the at least one second device according to signal strength of all synchronization signal blocks received by the k antenna panels, the processor is configured to:

acquire a target synchronization signal block from the synchronization signal blocks received by the k antenna panels, the target synchronization signal block referring to a synchronization signal block with the strongest signal strength, among the synchronization signal blocks received by the k antenna panels; and determine a second device that sends the target synchronization signal block as the second target device.

Alternatively, in the operation that a second target device that performs synchronization is determined from the at least one second device according to signal strength of all synchronization signal blocks received by the k antenna panels, the processor is configured to:

acquire an average value of signal strength of M synchronization signal blocks with the strongest signal strength, received by the k antenna panels and sent by each second device among the at least one second device, where M is an integer greater than or equal to 2; and determine a second device corresponding to the highest average value as the second target device.

Alternatively, in the operation that an average value signal strength of M synchronization signal blocks with the strongest signal strength, received by the k antenna panels and sent by each second device of the at least one second device, is acquired, the processor is configured to:

acquire the sum of signal strength of the M synchronization signal blocks with the strongest signal strength, received by the k antenna panels and sent by a target device, the target device referring to any device of the at least one second device; and divide the sum of signal strength by M to obtain an average value of the signal strength of the M synchronization signal blocks with the strongest signal strength, sent by the target device.

Alternatively, in the operation that an average value of signal strength of M synchronization signal blocks with the strongest signal strength, received by the k antenna panels and sent by each second device of the at least one second device is acquired, the processor is configured to:

acquire the signal strength of M synchronization signal blocks with the strongest signal strength, received by the k antenna panels and sent by a target device;

acquire weights of the M synchronization signal blocks; and perform weighted averaging on the signal strength of the M synchronization signal blocks according to the weights of the M synchronization signal blocks, to obtain an average value of the signal strength of the M synchronization signal blocks.

Alternatively, the synchronization signal blocks, sent by at least one antenna panel of the same second device at the same symbol positions in a time window occurring periodically for transmission of synchronization signal blocks, contain the same synchronization signal block identifiers and the same synchronization signal block contents; and the synchronization signal blocks, sent by at least one antenna panel of the same second device at different symbol positions in the time window occurring periodically for transmission of synchronization signal blocks, contain different synchronization signal block identifiers.

Alternatively, DMRS sequences of the synchronization signal blocks, sent at the same symbol positions in the time window occurring periodically for transmission of synchronization signal blocks, are the same, and the synchronization signal blocks at the same symbol positions are received using the same receiving beam(s).

An embodiment of the present disclosure further provides an apparatus for transmitting a synchronization signal block, which may implement all or part of the steps executed by the second device in the embodiments of the present disclosure shown in FIG. 2, or FIG. 3. The apparatus for transmitting a synchronization signal block includes a processor; and a memory configured to store instructions executable by the processor.

The processor is configured to:

respectively send synchronization signal blocks through j antenna panels of the m antenna panels, where 2≤j≤m, and j is an integer.

Alternatively, the synchronization signal blocks, sent by the j antenna panels at the same symbol positions in a time window occurring periodically for transmission of synchronization signal blocks, contain the same synchronization signal block identifiers and the same synchronization signal block contents; and the synchronization signal blocks, sent by the j antenna panels at different symbol positions in the time window occurring periodically for transmission synchronization signal blocks, contain different synchronization signal block identifiers.

Alternatively, in the operation that synchronization signal blocks are respectively sent through j antenna panels of the m antenna panels, the processor is configured to:

in a first time period, respectively send the synchronization signal blocks through a first part of the j antenna panels, the first part of the antenna panel referring to at least one antenna panel of the j antenna panels; and in a second time period, respectively send the synchronization signal blocks through a second part of the j antenna panels, the second part of the antenna panels referring to at least one antenna panel of the j antenna panels, except for the first part of the antenna panels.

Alternatively, the processor is further configured to:

perform, through the j antenna panels in LBT mode, channel detection on frequency domain resources used by the second device for sending the synchronization signal blocks, before the synchronization signal blocks are respectively sent through j of the m antenna panels; and when a channel detection result of each of the j antenna panels indicates an idle state, execute the operation that the synchronization signal blocks are respectively sent through j antenna panels of the m antenna panels.

Alternatively, the frequency domain resources used by the second device for sending the synchronization signal blocks are unlicensed spectrum;

or, the frequency domain resources used by the second device for sending the synchronization signal blocks are frequency domain resources shared by multiple second devices.

Alternatively, the number of antenna panels in a sending state at the same time among the m antenna panels is L, and a maximum sending power of each antenna panel in the L antenna panels is 1/L of a maximum sending power of the second device, where L is a positive integer less than or equal to m; or, the sum of sending powers of each of the L antenna panels is less than or equal to the maximum sending power of the second device.

It is to be noted that when realizing functions, the apparatus provided in the above embodiment is only described with division of the above various functional modules as an example and, during practical applications, the above functions may be allocated to different functional modules for realization according to a practical requirement, that is, a content structure of device is divided into different functional modules to realize all or part of the functions described above.

With respect to the apparatus in the above embodiments, the specific manners for performing operations of individual modules therein have been described in detail in the embodiments regarding the method, and will not be elaborated herein.

The above mainly describes the solutions provided by the embodiments of the present disclosure from the interaction of the first device and the second device. It can be understood that the first device and the second device, for realizing the above functions, include hardware structures and/or software modules corresponding to each function. The present disclosure may be implemented by hardware or a combination of hardware and computer software in combination with the units and algorithm steps of the various examples described in the embodiments disclosed herein. Whether a certain function is implemented in the form of hardware or in the form of computer software driving hardware depends on the specific applications and design constraint conditions of the technical solutions. Those skilled in the art may implement the described functions by using different methods for each specific application, but this implementation should not be considered beyond the scope of the present disclosure.

Figure 7:
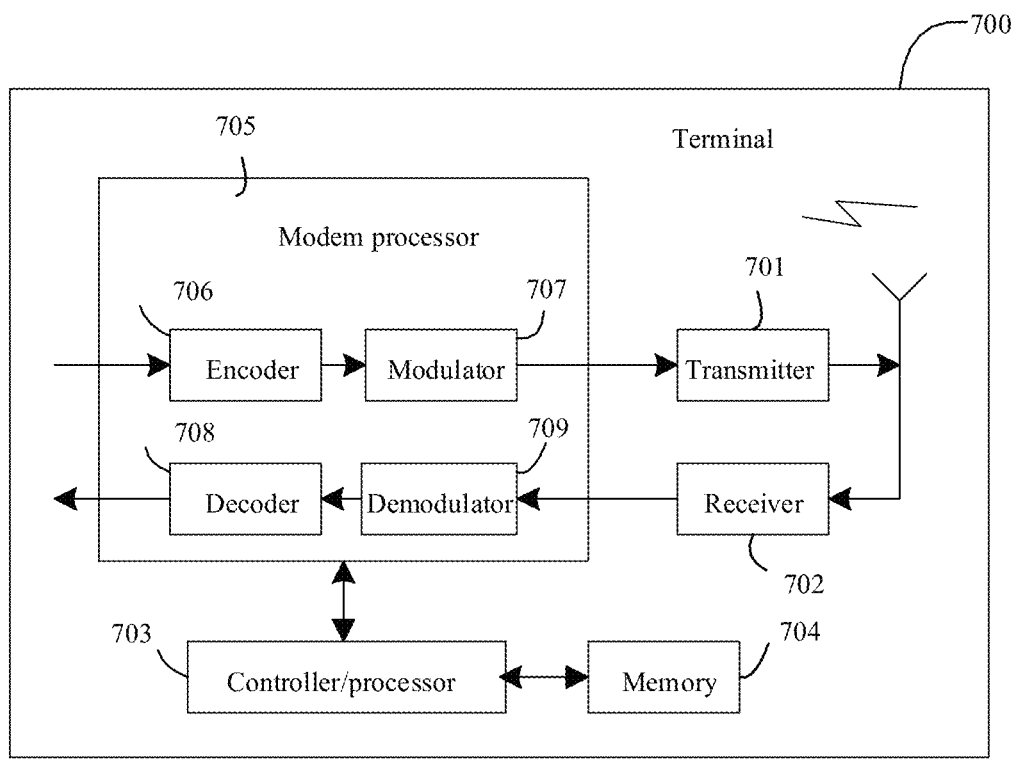
FIG. 7 is a structure diagram showing a terminal according to an embodiment.

FIG. 7 is a structure diagram showing a terminal according to an embodiment.

The terminal 700 includes a transmitter 701, a receiver 702 and a processor 703. The processor 703 may also be a controller, and is represented as the "controller/processor 703" in FIG. 7. Alternatively, the terminal 700 may further include a modem processor 705. The modem processor 705 may include an encoder 706, a modulator 707, a decoder 708 and a demodulator 709.

In an example, the transmitter 701 adjusts (for example, analog conversion, filtration, amplification and up-conversion, etc.) an output sample and generates an uplink signal, and the uplink signal is transmitted via antennas to the base station in the foregoing embodiments. On a downlink, the antenna receives a downlink signal transmitted by the base station in the foregoing embodiments. The receiver 702 adjusts (for example, filtration, amplification, down-conversion and digitalization, etc.) the signal from the antenna and provides an input sample. In the modem processor 705, the encoder 706 receives service data and a signaling message to be sent on the uplink, and processes (such as formalization, encoding and interleaving) the service data and the signaling message. The modulator 707 further processes (such as symbol mapping and modulation) the encoded service data and signaling message and provides an output sample. The demodulator 709 processes (such as demodulation) the input sample and provides symbol estimation. The decoder 708 processes (such as de-interleaving and decoding) the symbol estimation and provides the decoded data and signaling message sent to the terminal 700. The encoder 706, the modulator 707, the demodulator 709 and the decoder 708 may be implemented by a synthetic modem processor 705. These units are processed according to wireless access technologies (such as LTE and access technologies of other evolved systems) adopted by the wireless access networks. It is to be noted that when the terminal 700 does not include the modem processor 705, the above functions of the modem processor 705 may also be completed by the processor 703.

The processor 703 controls actions of the terminal 700, and is configured to execute processing steps performed by the terminal 700 in the embodiments of the present disclosure. For example, the processor 703 is further configured to execute the steps of the terminal side in the above method embodiments, and/or other steps of the technical solutions described in the embodiments of the present disclosure.

Further, the terminal 700 may further include a memory 704. The memory 704 is configured to store program codes and data for the terminal 700.

It can be understood that FIG. 7 only shows a simplified design of the terminal 700. During a practical application, the terminal 700 may include any number of transmitters, receivers, processors, modem processors, and memories, and all terminals capable of implementing the embodiments of the present disclosure fall within the protection scope of the embodiments of the present disclosure.

Figure 8:
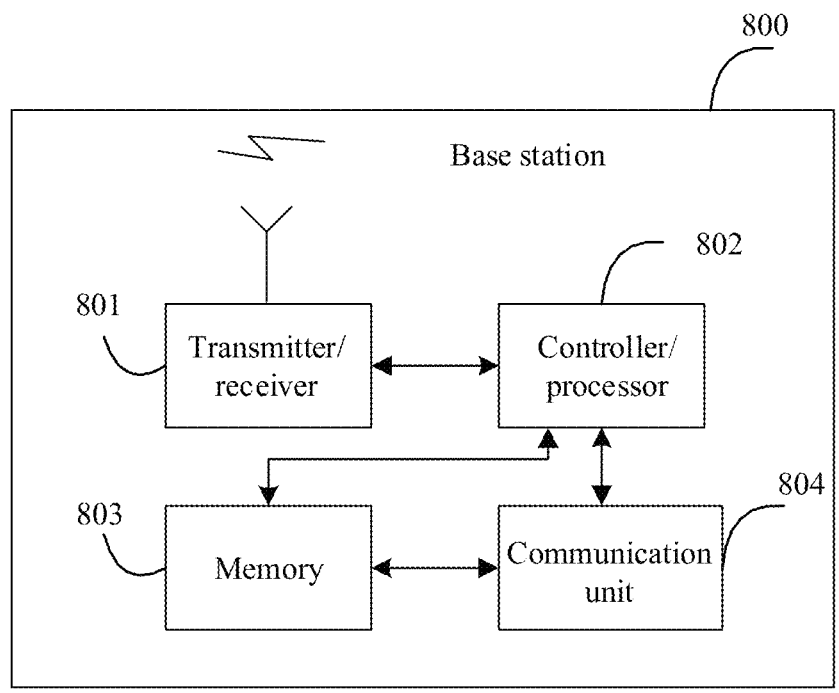
FIG. 8 is a structure diagram showing a base station according to an embodiment.

FIG. 8 is a structure diagram showing a base station according to an embodiment.

The base station 800 includes a transmitter/receiver 801 and a processor 802. The processor 802 may also be a controller, and is represented as the "controller/processor 802" in FIG. 8. The transmitter/receiver 801 is configured to support sending and receiving of information between the base station and the terminal in the foregoing embodiments, and to support the communication between the base station and other network entities. The processor 802 executes various functions for communication with the terminal. On the uplink, an uplink signal from the terminal is received through antennas, then demodulated by the receiver 801 (for example, a high-frequency signal is demodulated into a baseband signal), and further processed by the processor 802, so that service data and signaling messages sent by the terminal are restored. On the downlink, the service data and signaling messages are processed by the processor 802, and modulated by the transmitter 801 (for example, the baseband signal is modulated into a high-frequency signal) to generate a downlink signal, which is transmitted to the terminal through antennas. It is to be noted that the above demodulation or modulation function may also be implemented through the processor 802. For example, the processor 802 is further configured to execute the steps of the base station side in the above method embodiments, and/or other steps of the technical solutions described in the embodiments of the present disclosure.

Furthermore, the base station 800 may further include a memory 803, and the memory 803 is configured to store program codes and data of the base station 800. In addition, the base station 800 may further include a communication unit 804. The communication unit 804 is configured to support the base station 800 to communicate with another network entity (for example, a network device in a core network). For example, in the 5G NR system, the communication unit 804 may be an NG-U interface to support communication between the base station 800 and a User Plane Function (UPF) entity; or, the communication unit 804 may also be an NG-C interface to support communication between the base station 800 and an Access and Mobility Management Function (AMF) entity.

It can be understood that FIG. 8 only shows a simplified design of the base station 800. During a practical application, the base station 800 may include any number of transmitters, receivers, processors, controllers, memories, communication units and the like, and all base stations capable of implementing the embodiments of the present disclosure fall within the scope of protection of the embodiments of the present disclosure.

According to the present disclosure, the first device is able to use various antenna panels thereof for receiving a synchronization signal block sent by at least one second device, thereby improving the synchronization signal block reception efficiency of a device having a plurality of antenna panels, and expanding application scenarios for transmitting synchronization signal blocks.

For an application scenario where the first device has multiple antenna panels, according to the present disclosure, the first device receives, through k antenna panels of n antenna panels, the synchronization signal blocks sent by at least one second device through at least one antenna panel, and the second target device that performs synchronization is determined from the at least one second device according to the signal strength of the synchronization signal blocks received by the k antenna panels. Therefore, the first device can receive the synchronization signal blocks from at least one second device based on different antenna panels thereof, so that the efficiency of receiving synchronization signal block by the device with multiple antenna panels is improved, while the application scenarios of synchronization signal block transmission are expanded.

Those skilled in the art may realize that, in one or more of the above examples, the functions described in the embodiments of the present disclosure may be realized by hardware, software, firmware or any combination thereof. When implemented by using the software, these functions may be stored in a computer-readable medium or transmitted as one or more instructions or codes on the computer-readable medium. The computer-readable medium may include a computer storage medium and a communication medium. The communication medium includes any medium that facilitates the transmission of a computer program from one place to another place. The storage medium may be any available medium that can be accessed by a universal or dedicated computer.

An embodiment of the present disclosure also provides a computer storage medium, configured to store a computer software instruction for the first device or the second device, including a program designed to execute the synchronization signal block transmission method.

It is to be understood that the term "multiple" in the present disclosure refers to more or more than two. The "and/or" is an association relationship for describing associated objects and represents that three relationships may exist. For example, A and/or B may represent the following three cases: only A exists, both A and B exist, and only B exists. The character "/" generally indicates that the related objects are in an "or" relationship.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for transmitting a synchronization signal block, comprising:

receiving, by a first device comprising n antenna panels and through k antenna panels of the n antenna panels, synchronization signal blocks sent by at least one second device through at least one antenna panel, wherein n is an integer greater than or equal to 2, and k is a positive integer not greater than n; and determining a second target device that performs synchronization from the at least one second device according to signal strength of all synchronization signal blocks received by the k antenna panels, wherein synchronization signal blocks, sent by at least one antenna panel of a same second device at same symbol positions in a time window occurring periodically for transmission of synchronization signal blocks, comprise same synchronization signal block identifiers and same synchronization signal block contents; and synchronization signal blocks, sent by at least one antenna panel of a same second device at different symbol positions in the time window occurring periodically for transmission of synchronization signal blocks, comprise different synchronization signal block identifiers.

2. The method of claim 1, wherein determining the second target device that performs synchronization from the at least one second device according to the signal strength of all synchronization signal blocks received by the k antenna panels comprises:

acquiring a target synchronization signal block from the synchronization signal blocks received by the k antenna panels, the target synchronization signal block referring to a synchronization signal block with strongest signal strength among the synchronization signal blocks received by the k antenna panels; and determining a second device that sends the target synchronization signal block as the second target device.

3. The method of claim 1, wherein determining the second target device that performs synchronization from the at least one second device according to signal strength of all synchronization signal blocks received by the k antenna panels comprises:

acquiring an average value of signal strength of M synchronization signal blocks with strongest signal strength received by the k antenna panels and sent by each second device of the at least one second device, wherein M is an integer greater than or equal to 2; and determining a second device corresponding to a highest average value as the second target device.

4. The method of claim 3, wherein acquiring the average value of signal strength of M synchronization signal blocks with the strongest signal strength received by the k antenna panels and sent by each second device of the at least one second device comprises:

acquiring a sum of signal strength of the M synchronization signal blocks with the strongest signal strength received by the k antenna panels and sent by a target device, the target device referring to any device of the at least one second device; and dividing the sum of the signal strength by M to obtain the average value of the signal strength of the M synchronization signal blocks with the strongest signal strength sent by the target device.

5. The method of claim 3, wherein acquiring the average value of signal strength of M synchronization signal blocks with the strongest signal received by the k antenna panels and sent by each second device of the at least one second device comprises:

acquiring signal strength of the M synchronization signal blocks with the strongest signal strength received by the k antenna panels and sent by a target device;

acquiring weights of the M synchronization signal blocks;

performing weighted averaging on the signal strength of the M synchronization signal blocks according to the weights of the M synchronization signal blocks to obtain the average value of the signal strength of the M synchronization signal blocks.

6. The method of claim 1, wherein

Demodulation Reference Signal (DMRS) sequences of synchronization signal blocks, sent at same symbol positions in a time window occurring periodically for transmission of synchronization signal blocks, are the same, and the synchronization signal blocks at the same symbol positions are received using a same receiving beam.

7. A method for transmitting a synchronization signal block, comprising:

respectively sending, by a second device comprising m antenna panels, synchronization signal blocks through j antenna panels of the m antenna panels, wherein m is an integer greater than or equal to 2, and wherein $2 \leq j \leq m$, and j is an integer, wherein synchronization signal blocks, sent by the j antenna panel at same symbol positions in a time window occurring periodically for transmission of synchronization signal blocks, comprise same synchronization signal block identifiers and same synchronization signal block contents; and synchronization signal blocks, sent by the j antenna panels at different symbol positions in the time window occurring periodically for transmission of synchronization signal blocks, comprise different synchronization signal block identifiers.

8. The method of claim 7, wherein respectively sending the synchronization signal blocks through j antenna panels of the m antenna panels comprises:

in a first time period, respectively sending the synchronization signal blocks through a first part of antenna panels in the j antenna panels, the first part of antenna panels referring to at least one antenna panel of the j antenna panels; and in a second time period, respectively sending the synchronization signal blocks through a second part of antenna panels in the j antenna panels, the second part of antenna panels referring to at least one antenna panel of the j antenna panels, except for the first part of antenna panels.

9. The method of claim 7, further comprising:

performing, through the j antenna panels in a listen before talk (LBT) mode, channel detection on frequency domain resources used by the second device for sending the synchronization signal blocks; and in response to determining that a channel detection result of each of the j antenna panels indicates an idle state, respectively sending the synchronization signal blocks through the j antenna panels of the m antenna panels.

10. The method of claim 9, wherein the frequency domain resources used by the second device for sending the synchronization signal blocks are unlicensed spectrum;

or, the frequency domain resources used by the second device for sending the synchronization signal blocks are frequency domain resources shared by multiple second devices.

11. The method of claim 7, wherein a number of antenna panels in a sending state at a same time among the m antenna panels is L, and a maximum sending power of each antenna panel in the L antenna panels is 1/L of a maximum sending power of the second device, wherein L is a positive integer less than or equal to m; or a sum of sending powers of each of the L antenna panels is less than or equal to the maximum sending power of the second device.

12. An apparatus for transmitting a synchronization signal block for implementing the method of claim 7, comprising:

a transmitter, configured to respectively send synchronization signal blocks through j antenna panels of m antenna panels comprised in a second device, wherein 2≤j≤m, m is an integer greater than or equal to 2, and j is an integer.

13. An apparatus for transmitting a synchronization signal block, comprising:

a receiver, configured to receive, through k antenna panels of n antenna panels comprised in a first device, synchronization signal blocks sent by at least one second device through at least one antenna panel, wherein n is an integer greater than or equal to 2, and k is a positive integer not greater than n; and a processor, configured to determine a second target device for performing synchronization from the at least one second device according to signal strength of all synchronization signal blocks received by the k antenna panels, wherein synchronization signal blocks, sent by at least one antenna panel of a same second device at same symbol positions in a time window occurring periodically for transmission of synchronization signal blocks, comprise same synchronization signal block identifiers and same synchronization signal block contents; and synchronization signal blocks, sent by at least one antenna panel of a same second device at different symbol positions in the time window occurring periodically for transmission of synchronization signal blocks, comprise different synchronization signal block identifiers.

14. The apparatus of claim 13, wherein the processor is further configured to:

acquire a target synchronization signal block among the synchronization signal blocks received by the k antenna panels, the target synchronization signal block referring to a synchronization signal block with strongest signal strength among the synchronization signal blocks received by the k antenna panels; and determine a second device that sends the target synchronization signal block as the second target device.

15. The apparatus of claim 13, wherein the processor is further configured to:

acquire an average value of signal strength of M synchronization signal blocks with strongest signal strength received by the k antenna panels and sent by each second device of the at least one second device, where M is an integer greater than or equal to 2; and determine a second device corresponding to a highest average value as the second target device.

16. The apparatus of claim 15, wherein the processor is further configured to:

acquire a sum of the signal strength of the M synchronization signal blocks with the strongest signal strength received by the k antenna panels and sent by a target device, the target device referring to any device of the at least one second device; and divide the sum of the signal strength by M to obtain the average value of the signal strength of the M synchronization signal blocks with the strongest signal strength sent by the target device.

17. The apparatus of claim 15, wherein the processor is further configured to:

acquire the signal strength of the M synchronization signal blocks with the strongest signal strength received by the k antenna panels and sent by a target device;

acquire weights of the M synchronization signal blocks; and perform weighted averaging on the signal strength of the M synchronization signal blocks according to the weights of the M synchronization signal blocks to obtain the average value of the signal strength of the M synchronization signal blocks.

18. The apparatus of claim 13, wherein Demodulation Reference Signal (DMRS) sequences of synchronization signal blocks sent at same symbol positions in a time window occurring periodically for transmission of synchronization signal blocks, are the same, and the synchronization signal blocks at the same symbol positions are received using a same receiving beam.

\* \* \* \* \*